United States Patent [19]

Dishner et al.

[11] Patent Number: 4,692,671
[45] Date of Patent: Sep. 8, 1987

[54] ELECTRICALLY-COMPENSATED CONSTANT SPEED DRIVE

[75] Inventors: Bryan W. Dishner, Roscoe, Ill.; Richard D. Juarros, Los Lunas, N. Mex.; P. John Dhyanchand, Rockford, Ill.

[73] Assignee: Sundstrand Corporation, Rockford, Ill.

[21] Appl. No.: 893,946

[22] Filed: Aug. 6, 1986

Related U.S. Application Data

[63] Continuation-in-part of Ser. No. 812,396, Dec. 23, 1985, abandoned.

[51] Int. Cl.$^4$ .......................... F01D 15/10; H02P 9/00
[52] U.S. Cl. ........................................ 318/11; 318/14; 322/40; 290/4 C
[58] Field of Search .................... 318/9, 10, 11, 12, 13, 318/14, 45, 49, 50, 86, 111; 290/7, 4 C, 4 R, 11, 14, 19, 1 R; 322/12, 13, 16, 39, 40

[56] References Cited

U.S. PATENT DOCUMENTS

| | | | |
|---|---|---|---|
| 3,056,914 | 10/1962 | Potter | 322/40 |
| 3,103,613 | 9/1963 | Riley | 318/11 |
| 4,437,050 | 3/1984 | Overzet | 318/798 |
| 4,572,961 | 2/1986 | Borger | 290/4 R |

OTHER PUBLICATIONS

Article entitled "Electrically Compensated Aircraft Alternator Drive" by J. J. Cathey, IEEE publication No. 0547-3578/83/0000-0116, 1983.

Primary Examiner—William M. Shoop, Jr.
Assistant Examiner—Bentsu Ro
Attorney, Agent, or Firm—Wood, Dalton, Phillips, Mason & Rowe

[57] ABSTRACT

An electrically-compensated constant speed drive according to the present invention includes a speed summer having first and second input shafts and an output shaft at which constant speed motive power is developed wherein the first input shaft is coupled to a prime mover output shaft. A speed-compensating permanent magnet machine includes a motive power shaft coupled to the second input shaft of the speed summer and electrical power windings. A control permanent magnet machine includes a motive power shaft coupled to the output shaft of the speed summer and also includes electrical power windings. A power converter interconnects the power windings of the permanent magnet machines and comprises a first bi-directional AC/DC converter coupled to the electrical power windings of one of the permanent magnet machines, a second bi-directional AC/DC converter coupled to the electrical power windings of the other of the permanent magnet machines, a bi-directional DC/DC converter coupled between the AC/DC converters and a circuit for controlling the converters whereby the speed compensating permanent magnet machine develops compensating speed of a magnitude and direction sufficient to maintain the speed summer output shaft at the desired speed.

24 Claims, 12 Drawing Figures

FIG. 3

| MODE | A | B | C | D | E | L | SW1-SW6 | SW7-SW12 | SW21 | SW22 | SW17 | SW18 | SW19 | SW20 | SW14-SW16 |
|---|---|---|---|---|---|---|---|---|---|---|---|---|---|---|---|
| BELOW | L | L | H | H | L | H | OFF | ⊓⊔⊓⊔ | L | L | L | H | H | L | ⊓⊔⊓⊔ |
| BELOW,BYPASS | L | L | H | H | L | L | OFF | ⊓⊔⊓⊔ | H | L | L | L | L | L | OFF |
| ABOVE,PMM2 PLUGGING | H | L | L | H | L | H | OFF | ⊓⊔⊓⊔ | L | L | L | H | H | L | ⊓⊔⊓⊔ |
| ABOVE | H | H | L | L | H | H | ⊓⊔⊓⊔ | OFF | L | L | H | L | L | H | ⊓⊔⊓⊔ |
| ABOVE,BYPASS | H | H | L | L | H | L | ⊓⊔⊓⊔ | OFF | L | H | L | L | L | L | OFF |

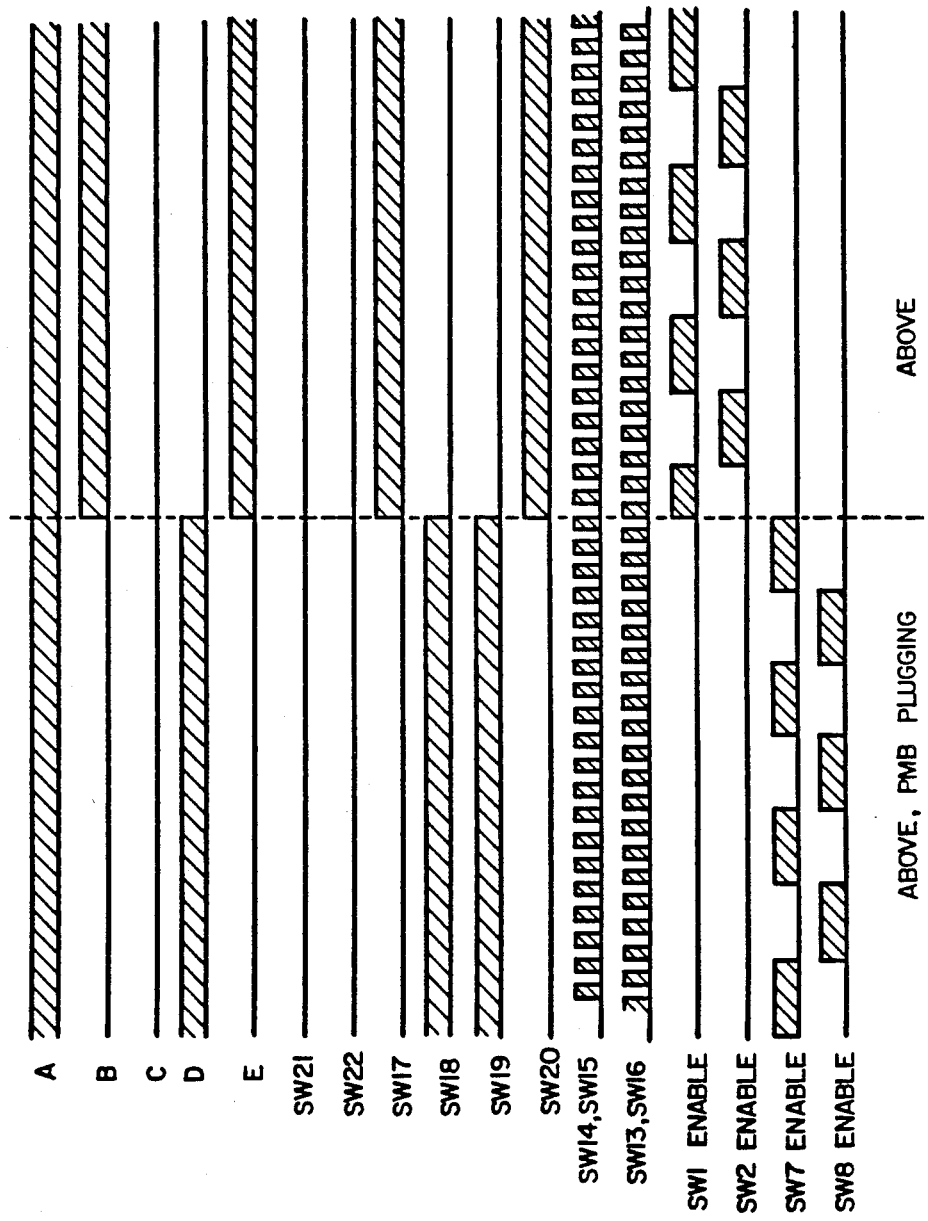

ELECTRICALLY-COMPENSATED CONSTANT SPEED DRIVE

CROSS-REFERENCE TO RELATED APPLICATION

This is a continuation-in-part application of Dishner et al, U.S. application Ser. No. 812,396, filed Dec. 23, 1985, entitled "Power Converter for an Electrically-Compensated Constant Speed Drive", and assigned to the assignee of the instant application, now abandoned.

TECHNICAL FIELD

The present invention relates generally to power converters, and more particularly to a power converter for use in the speed-compensation link of an electrically-compensated constant speed drive.

BACKGROUND ART

Constant speed drives (CSD's) are typically used to convert variable speed motive power from a prime mover into constant speed motive power for driving a generator so that it produces constant frequency electrical power. Known CSD's are of the hydromechanical type which have been found to encounter difficulties in certain applications. For example, when such CSD's are used in aircraft, it has been found that the drives are sensitive to aircraft attitude changes and that maintenance intervals are shorter than desired.

Electrically-compensated CSD's have been proposed for use in applications where conventional CSD's have been found to be inadequate. Known electrically-compensated CSD's include a mechanical differential speed summer having a first input shaft coupled to the output shaft of the prime mover, a second input shaft and an output shaft at which the constant speed motive power is developed. A speed-compensation link is coupled to the second input shaft of the speed summer and includes a first or compensating permanent magnet machine having a power shaft coupled to the second input of the differential speed summer and electrical power windings. A motive power shaft of a second or control permanent magnet machine is coupled to either the output shaft of the prime mover or the output of the differential speed summer. Electrical power is transferred between the windings of the first permanent magnet machine and electrical power windings of the second permanent magnet machine by either a DC link inverter or a cycloconverter so that the compensating permanent magnet machine develops compensating speed of a magnitude and direction which causes the output of the differential to be driven at the desired constant speed.

The DC link inverter for controlling the flow of power between the windings of the permanent magnet machines has been found to cause excessive current flow in one of the machines at certain operating speeds. The cycloconverter was thought to be capable of superior performance as compared to the DC link inverter; however, this type of power converter is also subject to numerous generating difficulties. Chief among these is that the cycloconverter presents a low power factor load to the permanent magnet machines, in turn requiring unduly large and heavy machines. Also, at low speeds the cycloconverter can cause generation of pulsating torque at frequencies which are sufficiently low to permit response thereto by the mechanical components in the system. Further, at low operating speeds the permanent magnet machines do not produce enough voltage to permit natural commutation of SCR's in the cycloconverter.

There is a need, therefore, for a power converter which can be used in an electrically-compensated constant speed drive that is not subject to the difficulties noted above.

DISCLOSURE OF INVENTION

In accordance with the present invention, an electrically-compensated constant speed drive includes a power converter which accomplishes the transfer of power between permanent magnet machines in a simple and effective manner without the disadvantages noted above.

More particularly, an electrically-compensated CSD for developing constant speed motive power from variable speed motive power developed at an output shaft of a prime mover includes a speed summer having first and second input shafts and an output shaft at which the constant speed motive power is developed wherein the first input shaft is coupled to the prime mover output shaft. A speed-compensating permanent magnet machine having a motive power shaft is coupled to the second input shaft of the speed summer and includes electrical power windings. A control permanent magnet machine includes electrical power windings and a motive power shaft coupled to the output shaft of the speed summer. A power converter interconnects the electrical power windings of the permanent magnet machines and includes a first bi-directional AC/DC converter coupled to the electrical power windings of one of the permanent magnet machines, a second bi-directional AC/DC converter coupled to the electrical power windings of the other of the permanent magnet machines and a bi-directional DC/DC converter coupled between the AC/DC converters. Means are included for controlling the AC/DC converters and the DC/DC converter whereby electrical power is transferred between the permanent magnet machines so that the speed compensating permanent magnet machine develops compensating speed of a magnitude and direction sufficient to maintain the speed summer output shaft at the desired speed.

In the preferred embodiment, the AC/DC converters are identical and comprise a plurality of power switches which are connected in a bridge configuration together with flyback diodes coupled across the switches. The DC/DC converter includes a bridge inverter for converting input DC power from one of the AC/DC converters into intermediate AC power, a transformer having a primary winding coupled to the output of the bridge inverter and a secondary winding in which is developed transformer output power and a rectifier circuit coupled to the secondary winding for rectifying the transformer output power to develop output DC power for the other of the AC/DC converters.

Means are included for bypassing the DC/DC converter and for directly applying the output of one of the AC/DC converters to the input of the other of the AC/DC converters when the output voltage developed by one of the permanent magnet machines is above a predetermined level. This bypassing increases the overall efficiency of the converter.

BRIEF DESCRIPTION OF THE DRAWINGS

FIG. 3 is a table illustrating the state of certain signals and operation of certain switches in the power converter shown in FIGS. 2A and 2B;

FIGS. 4A-4C is a series of waveform diagrams illustrating the operation of the power converter shown in FIGS. 2A and 2B;

BEST MODE FOR CARRYING OUT THE INVENTION

Figure 1:
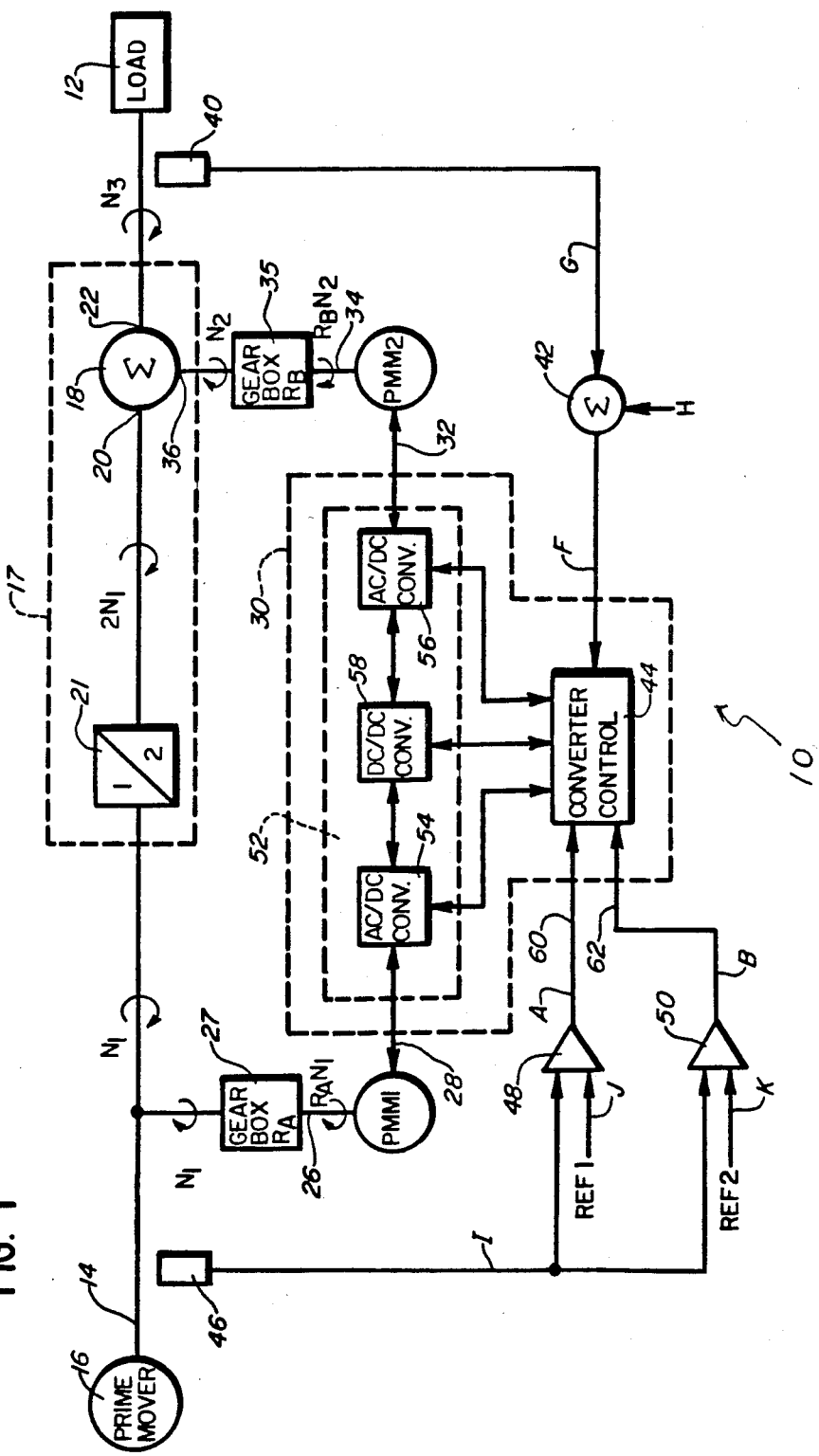
FIG. 1 is a block diagram of an electrically-compensated constant speed drive and power converter according to the present invention.

Referring now to FIG. 1, there is illustrated an electrically-compensated constant speed drive (CSD) 10 which develops constant speed motive power for driving a load 12 from variable speed motive power developed at an output shaft 14 of a prime mover 16. The load 12 may comprise, for example, a generator. The CSD 10 includes a mechanical differential 17 comprising a speed summer 18 having a first input shaft 20 coupled to the output shaft 14 of the prime mover 16. The differential 17 accomplishes a 2:1 speed increase which is represented by the block 21 in FIG. 1. The speed summer further includes an output shaft 22 which is coupled to the load 12. A first or control permanent magnet machine PMM1 includes a motive power shaft 26 which is coupled by a gear box 27 to the output shaft 14 of the prime mover 16. The PMM1 further includes electrical power windings which are coupled by conductors 28 to a power converter 30.

A second or speed-compensating permanent magnet machine PMM2 includes electrical power windings which are coupled by conductors 32 to the power converter 30. The PMM2 further includes a motive power shaft 34 which is coupled through a gear box 35 to a second input 36 of the differential speed summer 18.

The gear boxes 27 and 35 are speed multipliers having speed ratios of $R_A$ and $R_B$, respectively. More specifically, if $N_1$ is the output speed of the prime mover 14, the speed of the motive power shaft 26 of the PMM1 is equal to $R_A N_1$. Likewise, if the speed of the shaft coupled to the input 36 of the speed summer 18 is $N_2$, then the speed of the motive power shaft 34 of the PMM2 is equal to $R_B N_2$.

The speed of the output shaft 22 of the speed summer 18 is detected by a speed sensor 40. The speed sensor 40 develops a speed signal which is coupled to one input of a summing junction 42. A second input of the summing junction 42 receives a speed command signal representing the desired output speed of the speed summer 18. The summing junction 42 subtracts the two signals at the inputs and develops a speed error signal representing the difference between the actual output speed of the speed summer 18 and the commanded speed. The speed error signal is coupled to a converter control circuit 44 which is a part of the power converter 30.

The speed of the output shaft 14 of the prime mover 16 is detected by a second speed sensor 46 which develops a signal representative thereof. This signal is coupled to noninverting inputs of first and second threshold comparators 48,50. The comparators 48,50 include inverting inputs which receive reference signals REF1 and REF2, respectively. The outputs of these comparators are coupled to the converter control circuit 44 in the power converter 30.

The power converter 30 further includes power switching circuitry 52 which is controlled by the converter control 44. The power switching circuitry 52 comprises a first bi-directional AC/DC converter 54 which is coupled to the electrical power windings of the PMM1 by the conductors 28, a second bi-directional AC/DC converter 56 coupled to the electrical power windings of the PMM2 by the conductors 32 and a bi-directional DC/DC converter 58 which is coupled between and interconnects the AC/DC converters 54,56.

Briefly, the converter control 44 operates the converters 54-58 in one of a plurality of modes of operation to control the transfer of power between the permanent magnet machines PMM1 and PMM2 so that the speed-compensating PMM2 drives the shaft coupled to the input 36 at a speed magnitude and direction which causes the speed of the output 22 to be maintained at a desired speed.

The comparators 48,50 function as mode selection means in that they develop mode command signals on lines 60,62 which are a function of the speed of the output shaft 14 of the prime mover 16. In the preferred embodiment, there are five modes of operation of the permanent magnet machines PMM1,PMM2 and the power converter 30. These modes of operation are selected depending upon the relationship of the speed $N_1$ of the shaft 14 (or, alternatively the speed of the input of the mechanical differential 17 at the block 21) to a condition referred to as "straight-through". This condition occurs when the following equation is satisfied:

$$2 \times N_1 = N_3$$

where $N_3$ is the desired speed of the output shaft 22 of the speed summer 18. In other words, straight-through occurs when the speed at the first input 20 of the speed summer 18 is equal to the desired output speed $N_3$ so that no speed compensation is effected by the permanent magnet machine PMM2.

In the preferred embodiment, the CSD drives a four pole generator 12 at a desired speed of 12,000 rpm. In this case, straight-through occurs when the output shaft 14 of the prime mover 16 is driven at 6,000 rpm.

Of course, the constant speed drive 10 illustrated in the figures may be operated to produce a different constant desired speed, as required.

Figure 2A:
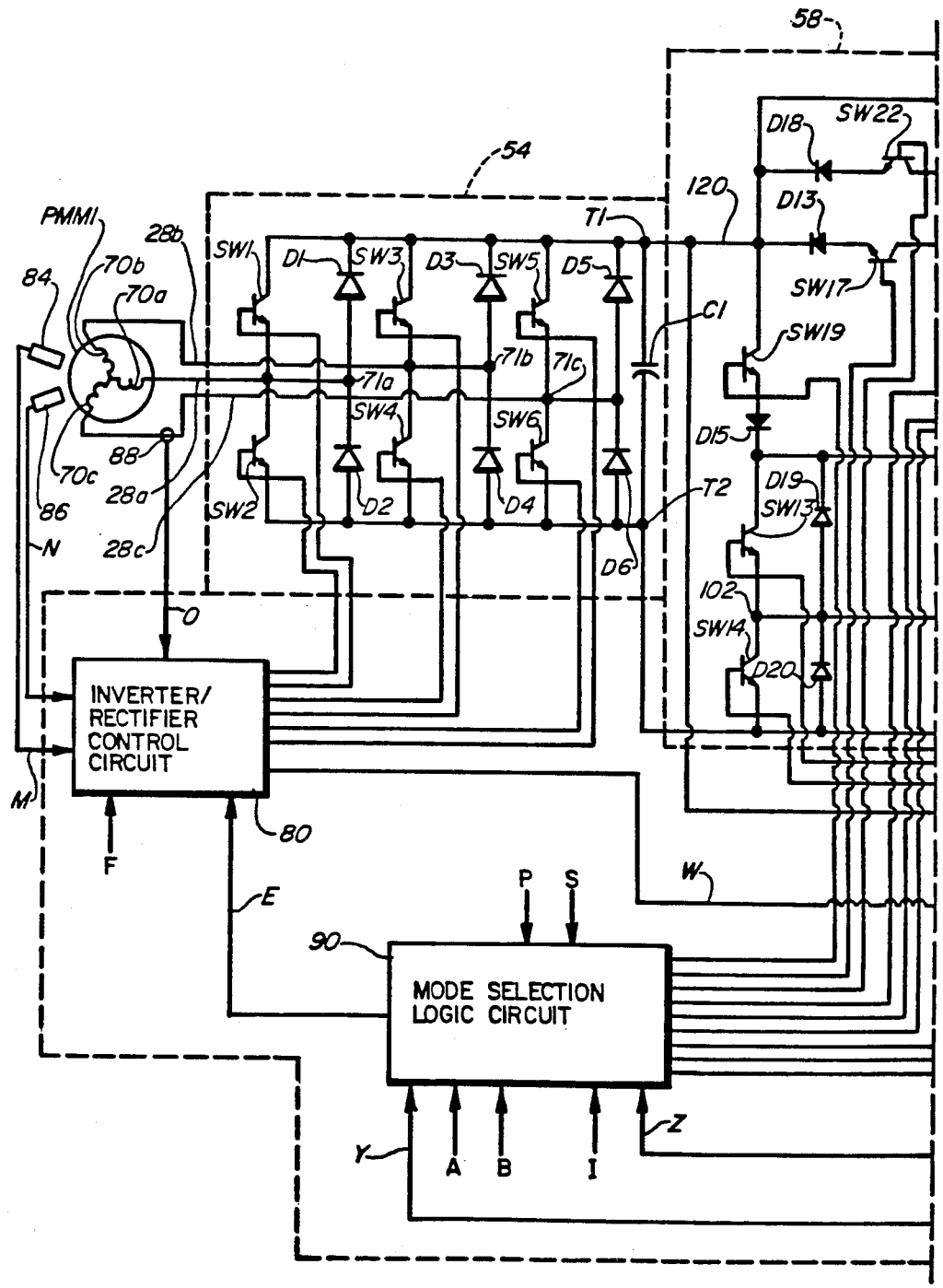
FIGS. 2A and 2B, when joined along the dashed lines, together comprise a combined schematic and block diagram of the power converter and permanent magnet machines shown in FIG. 1.
Figure 2B:
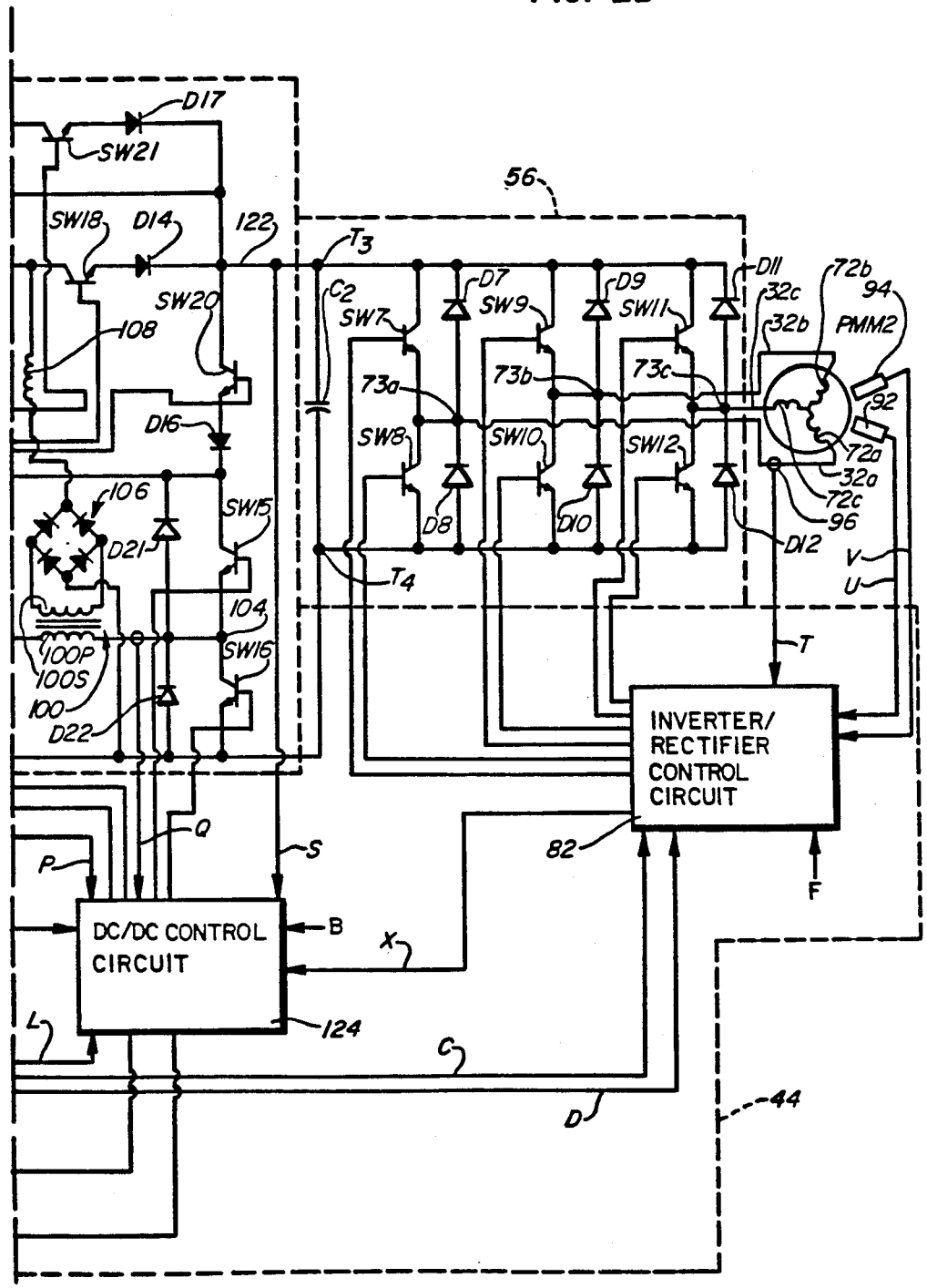

Referring now to FIGS. 2A and 2B, there is illustrated in greater detail the power converter 30 and the permanent magnet machines PMM1 and PMM2. In FIGS. 1 and 2A,2B, letters are used to identify signals carried on various lines shown therein. Identical reference letters in FIGS. 1 and/or 2A,2B designate lines which carry the same signal.

Each of the AC/DC converters 54,56 comprises six power switches SW1-SW6 and SW7-SW12, respectively. The six power switches in each of the converters 54,56 are connected in a three-phase bridge configuration. Flyback diodes D1-D6 and D7-D12 are coupled in anti-parallel relationship across the switches SW1-SW6 and SW7-SW12, respectively. A filtering capacitor C1 is coupled across input/output terminals T1,T2 of the converter 54 and a similar capacitor C2 is coupled across input/output terminals T3,T4 of the power converter 56.

Electrical power windings 70a–70c of the PMM1 are coupled by lines 28a–28c, respectively, to junctions 71a–71c between pairs of series-connected switches SW1–SW6.

In like fashion, electrical power windings 72a–72c of the permanent magnet machine PMM2 are coupled to junctions 73a–73c between pairs of series-connected switches SW7–SW12 by conductors 32a–32c.

The switches SW1–SW6 and SW7–SW12 are operated by inverter/rectifier control circuits 80,82, respectively. The control circuit 80 receives rotor position and speed signals M,N from sensors 84,86 representing the position and speed of the rotor of the permanent magnet machine PMM1 and a current signal O developed by a current sensor 88 representing the current in one of the phases of the electrical power windings 70. The control circuit also receives a signal F comprising the speed error signal from the summing junction 42, FIG. 1, and an enable signal E which, when high, enables operation of the switches SW1–SW6, as noted more specifically below. This signal is also developed by a mode selection logic circuit 90 described in greater detail below.

The inverter/rectifier control circuit 82 likewise receives speed and position signals U,V from sensors 92,94 representing the speed and position of the rotor of the permanent magnet machine PMM2. A current signal T is developed by a current sensor 96 and is coupled to the control circuit 82 along with the speed error signal F developed by the summing junction 42.

An enable signal D is coupled to the control circuit 82 which, when high, enables operation of the switches SW7–SW12. In addition, the control circuit 82 receives a direction signal C which, when high, indicates that the speed of the shaft 14 is below straight-through and which, when low, indicates that the speed of the shaft 14 is above straight-through. The signals C,D are developed by the mode selection logic circuit 90.

The DC/DC converter 58 comprises main switches SW13–SW16 which are connected in a H-bridge configuration and which, when operated, develop intermediate AC power. A transformer 100 includes a primary winding 100P coupled between junctions 102,104 and a secondary winding 100S which develops transformer output power. The secondary winding is coupled across input terminals of a rectifier circuit 106 which comprises a full wave rectifier. The junction 102 comprises the point of connection between the switches SW13 and SW14 while the junction 104 is at the point of connection between the switches SW15 and SW16.

An output terminal of the rectifier circuit 106 is coupled by an output inductor 108 to first and second output steering switches SW17,SW18, respectively. These switches are coupled through diodes D13,D14 to DC power buses 120, 122 which are in turn coupled to the input/output terminals T1, T3, respectively.

Each of the power buses 120,122 may be selectively connected to the switches SW13 and SW15 by closure of one of a pair of input steering switches SW19,SW20. Diodes D15 and D16 are connected in series with the emitters of the switches SW19,SW20 and are poled to prevent reverse conduction therethrough.

First and second bypass switches SW21 and SW22 are coupled together with diodes D17,D18 between the power buses 120,122. The switches SW21,SW22, when operated, cause bypassing of the DC/DC converter 58 in opposite directions, as noted more specifically below.

Flyback diodes D19–D22 are coupled across the switches SW13–SW16 to provide a path for reactive currents.

The switches SW13–SW16 are operated by a DC/DC control circuit 124 which controls the transfer of power between the converters 54,56. The control circuit 124 receives voltage signals P,S representing the voltage on the power buses 120,122, respectively, and a current signal Q representing the output current of the DC/DC converter 58.

The DC/DC control circuit 124 also receives an enable signal L which, when high, enables operation of the switches SW13–SW16, a signal B comprising the signal developed by the comparator 50, FIG. 1, and the speed error signal F from the summing junction 42.

The switches SW17–SW22 are operated by the mode selection logic circuit 90. This circuit receives the signals A and B from the comparators 48,50, FIG. 1, and the voltage signals P,S representing the voltage on the power buses 120,122.

With reference to the table of FIG. 3 and the waveforms of FIGS. 4A–4C, following is a general description of the operation of the circuitry shown in FIGS. 1 and 2A,2B in each of the operational modes under the assumption that the speed of the shaft 14 is increased from a lower limit below straight-through to an upper limit above straight-through.

The first operational mode occurs when the speed of the shaft 14 is well below straight-through (referred to as the "below" mode). In this case, the signal A developed by the comparator 48 is in a low state, as indicated by the table of FIG. 3. Under these conditions, the permanent magnet machine PMM1 must be operated as a generator and the PMM2 must be operated as a motor to provide compensating speed to the speed summer 18. Under this condition, the switches SW1–SW6 are opened so that the power developed by the PMM1 is full-wave rectified by the diodes D1–D6 and filtered by the capacitor C1. However, the relatively low rotational speed of the shaft 26 of the PMM1 results in insufficient voltage being developed at the terminals T1 and T2 to operate the PMM2 at the required speed. It is therefore necessary for the DC/DC control circuit 124 to operate the converter 58 as a step up converter so that the voltage on the bus 120 is boosted. While operating in this mode, the switches SW19 and SW18 are closed and the switches SW17 and SW20–SW22 are opened by the mode selection logic circuit 90 so that the bus 120 is coupled to the switches SW13–SW16 and the rectifier circuit 106 is coupled to the power bus 122. The switches SW13–SW16 are enabled by a high state signal L and are operated by the DC/DC control circuit 124 to boost the voltage on the power bus 120 and the boosted voltage is delivered to the switches SW7–SW12 via the power bus 122. The switches SW7–SW12 are operated by the control circuit 82 to control the flow of power to the PMM2 so that it develops the appropriate rotor speed and direction for compensation.

The signal D, as previously mentioned, is high at this time to enable operation of the switches SW7–SW12. The signal E is low so that operation of the switches SW1–SW6 is disabled. The signal C is high at this time to indicate that the permanent magnet machine PMM2 is to operate in a first or positive direction to accomplish positive speed compensation.

As the speed of the shaft 14 increases, the voltage developed at the terminals T1, T2 at the output of the AC/DC converter 54 approaches the back EMF voltage developed at the terminals T3,T4 of the AC/DC converter 56. When these voltages become close to one another, or, alternatively when the voltages on the buses 120, 122 are within a predetermined range of each other, a "below-bypass" mode of operation is initiated. At this point, the DC/DC converter 58 is not needed since the voltage on the bus 120 is sufficient to operate the permanent magnet machine PMM2 as a motor at the required speed. When this condition occurs, the mode selection logic circuit 90 closes the switch SW21 to couple the power buses 120,122 to one another. Also, the signal L drops to a low state which in turn disables the switches SW13-SW16 and the switches SW18, SW19 are opened. The DC/DC converter 58 is thereby deactuated, in turn improving the overall efficiency of the converter 30.

As the speed of the shaft 14 continues to increase, the voltage developed at the terminals T1,T2 may become greater than that required to operate the PMM2 at the appropriate speed. In such a case, the DC/DC converter 58 may be operated as a step down converter to step down the voltage between the power buses 120 and 122 so that the voltage on the power bus 122 is maintained at an appropriate value. This result may alternatively be achieved by operating the switches SW7-SW12 in a PWM mode of operation, if desired.

Eventually, the speed of the shaft 14 will reach and slightly exceed straight-through. Under this condition, the permanent magnet machine PMM2 must subtract speed from the speed summer 18. However, since the speed of the shaft 14 is only slightly above straight-through, the motive power shaft 34 of the PMM2 is turning at a relatively low rate. This relatively low rotational rate results in a relatively low voltage level being developed at the terminals T3,T4 of the converter 56, which voltage does not exceed the threshold level of the DC/DC converter 58. Moreover, the design of the differential speed summer 18 such that the torque at each of the inputs and outputs 20,36,22 must be the same. As a result, the PMM2 must develop torque at the output shaft 34 which torque is normally developed when the PMM2 is operating as a generator by loading the electrical power windings 72 thereof. As a practical matter, this cannot be accomplished at this point due to the relatively low voltage developed by the windings 72.

The solution to the above problem is to operate the permanent magnet machine PMM2 as a motor in the plugging mode so that power is dissipated in the windings 72. This is accomplished by operating the PMM1 as a generator and by shifting the phase of each of the switch control signals for the switches SW7-SW12 by 180° as compared with the switch control signals for these switches while operating the below or below-bypass modes.

Furthermore, while the PMM2 is operating in the plugging mode, the bypass switch SW21 is turned off and the switches SW18 and SW19 in the DC/DC converter 58 are closed to couple the DC power bus 120 to the switches SW13-SW16 and to couple the rectifier 106 to the converter 56. The switches SW13-SW16 are operated so that power developed by the PMM1 is delivered to the windings of the PMM2.

Once the speed of the shaft 14 rises above straight-through, the signals A and C switch states. The signal B, on the other hand, remains in the low state until a predetermined point is reached at which the PMM2 can be operated as a generator.

Once the speed of the shaft 14 has risen sufficiently above straight-through to permit the PMM2 to be operated as a generator, an "above" straight-through mode of operation is initiated. At this point, the enable signals D and E switch states so that the switches SW7-SW12 are disabled, i.e. opened, while the switches SW1-SW6 are enabled by the signal E. Further, the switches SW18 and SW19 are opened and the switches SW17 and SW20 are closed to connect the DC bus 122 to the switches SW13-SW16 and to connect the output of the rectifier circuit 106 to the bus 120. The switches SW13-SW16 are operated such that the DC/DC converter 58 operates as a step up converter to step up the voltage from the DC bus 122 to the bus 120. The switches SW1-SW6 are operated as an inverter in the full on mode to supply alternating voltage to the electrical power windings 70 of the PMM1. The PMM1 is thereby operated as a motor at a speed determined by the speed of the shaft 14.

As the speed of the shaft 14 continues to increase, the voltage developed by the PMM2 also continues to increase. Eventually, a point may be reached at which the DC/DC converter can be bypassed at which point an "above-bypass" mode is initiated. In this mode, the switch SW22 is closed and the switches SW13-SW20 are disabled. The DC/DC converter 58 is thereby turned off and bypassed so that the voltage on the bus 122 is delivered directly to the bus 120. This bypassing and deactuation of the converter 58 are undertaken in part in response to a change of state of the signal L developed by the mode selection logic circuit 90 which is coupled to the control circuit 124.

While in the "above-bypass" mode, the switches SW1-SW6 are controlled to inverter the DC voltage on the bus 120 into alternating current power so that the PMM1 is operated as a motor.

If the speed of the shaft 14 continues to significantly increase, the PMM2 may generate excessive voltage for operating the PMM1 as a motor. In this event, the DC/DC control circuit 124 may operate the converter 58 as a step down converter and/or the switches SW1-SW6 may be operated by the control circuit 80 in a PWM mode of operation so that the proper voltage is developed for the PMM1.

Figure 5:
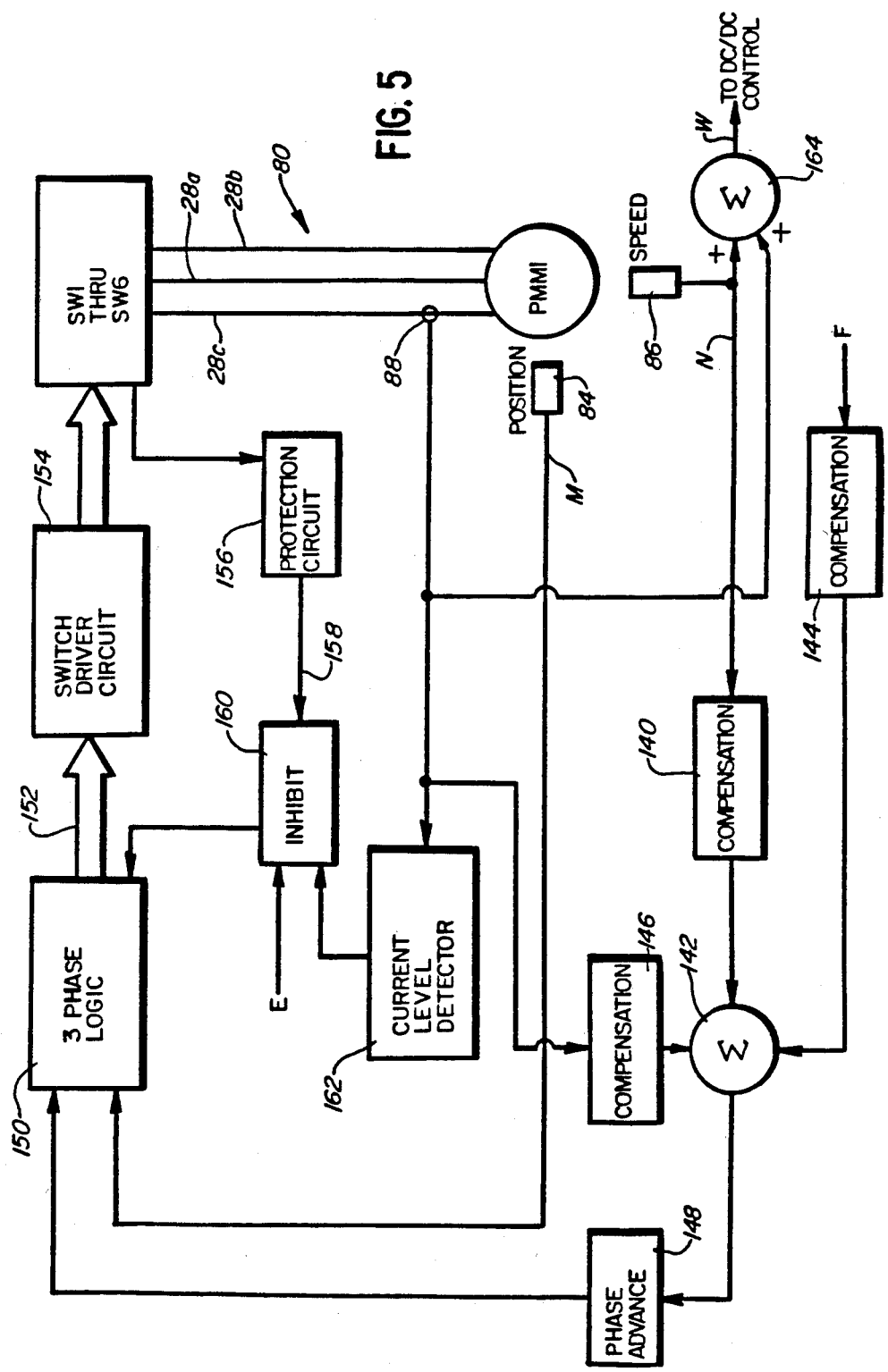
FIGS. 5-8 are block diagrams of the control and logic circuits shown in FIGS. 2A and 2B.

Referring now to FIG. 5, there is illustrated in greater detail the inverter/rectifier control circuit 80 shown in block diagram form in FIG. 2A.

Figure 4A:
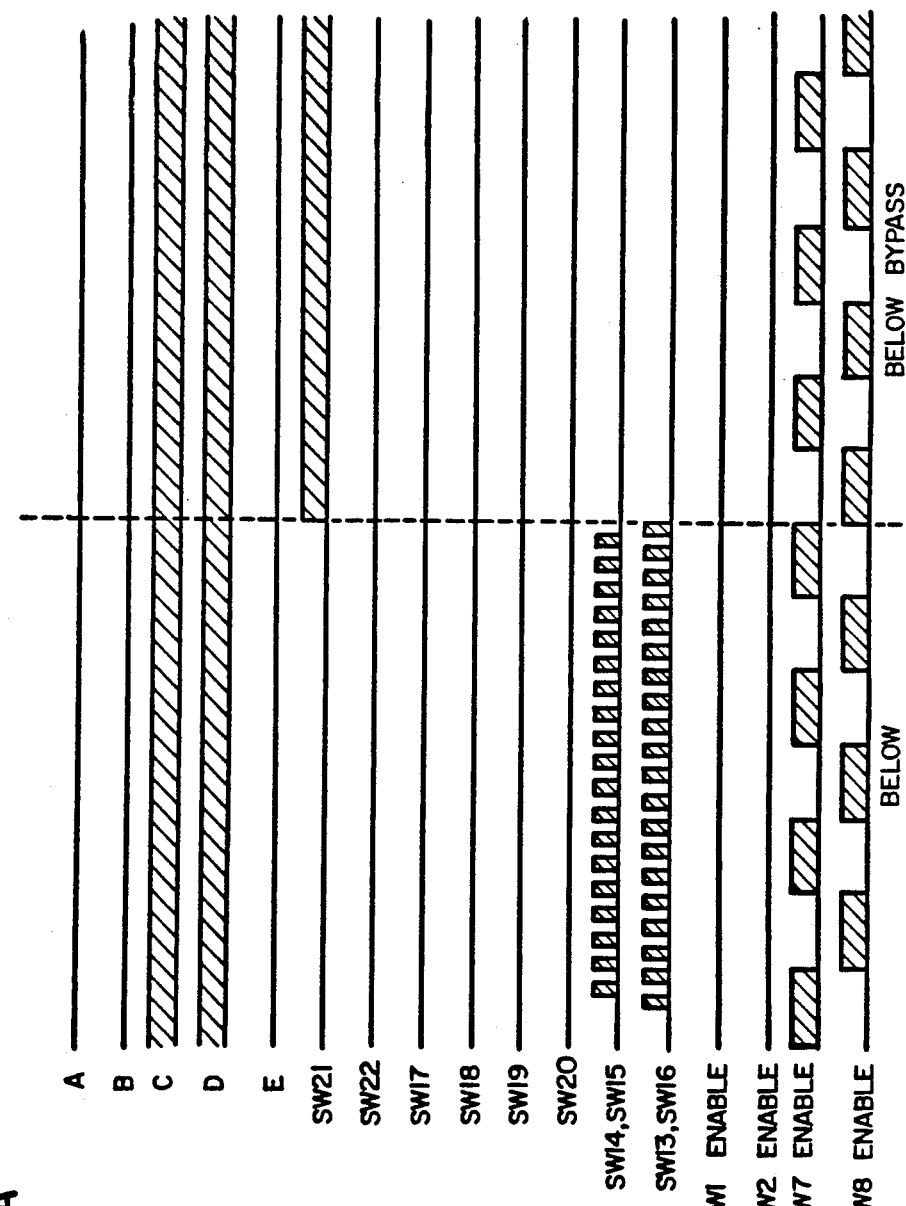
Figure 4C:
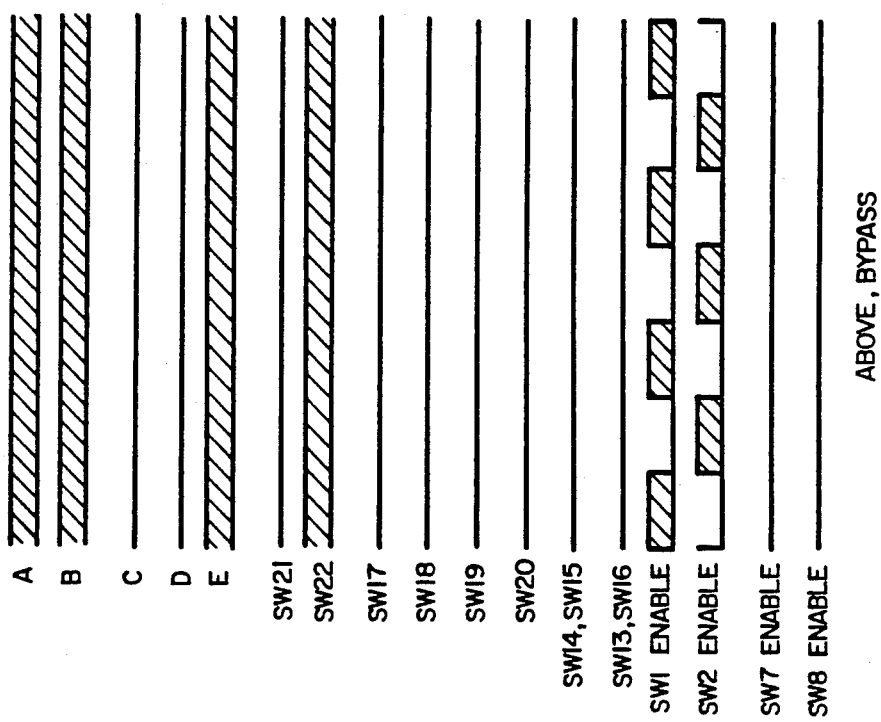

It should be noted that the waveforms of FIGS. 4A-4C for the switches SW1, SW2, SW7 and SW8, when high, indicate the times that these switches are enabled and can turn on and off in response to control signals. Enable signals for the remaining switches in the AC/DC converters 54, 56 are identical to those shown for the switches SW1, SW2, SW7 and SW8 except for the usual 120° phase shift common in converters of this type.

The speed signal N representing the speed of the motive power shaft of the PMM1 is compensated by a compensation circuit 140 and is coupled to one input of a summing junction 142. The summing junction sums the compensated speed signal with a compensated version of the speed error signal F produced by a block 144 and a compensated version of the motor phase current signal O produced by a block 146. The summing junction 142 thereby develops a commutation angle signal which is coupled to a phase advance circuit 148. The circuit 148 develops a signal representative of the required phase advance and couples this signal to one input of a three-phase logic circuit 150. The three-phase logic circuit 150 develops three-phase switching signals from the phase advance signal and the signal M representing rotor position on a series of lines 152. A switch driver circuit 154 converts the signals on the line 152 to the levels required to properly operate the switches SW1-SW6.

A protection circuit 156 monitors the operation of the switches SW1-SW6 to determine whether a fault or undesirable condition has arisen. These conditions may include, for example, shoot-through caused by simultaneous conduction of series-connected switches, an overvoltage condition, an overtemperature condition or the like. In the event such an undesirable condition arises, a high state signal is generated on a line 158 which is coupled to an inhibit circuit 160 that in turn disables the three-phase logic 150 so that the inverter is shut down.

A further protective function is accomplished by a current level detector 162 which causes the inhibit circuit 160 to shut down the inverter when an overcurrent condition arises in one of the three phases of the permanent magnet machine PMM1.

A summing junction 164 sums the signal O representing the current in one of the phases of the PMM1 with the speed signal N to derive a signal W representing the commanded bus voltage for the DC power bus 120. In other words, this signal represents the voltage necessary on the bus 120 to operate the PMM1 as a motor in the desired fashion.

Figure 6:
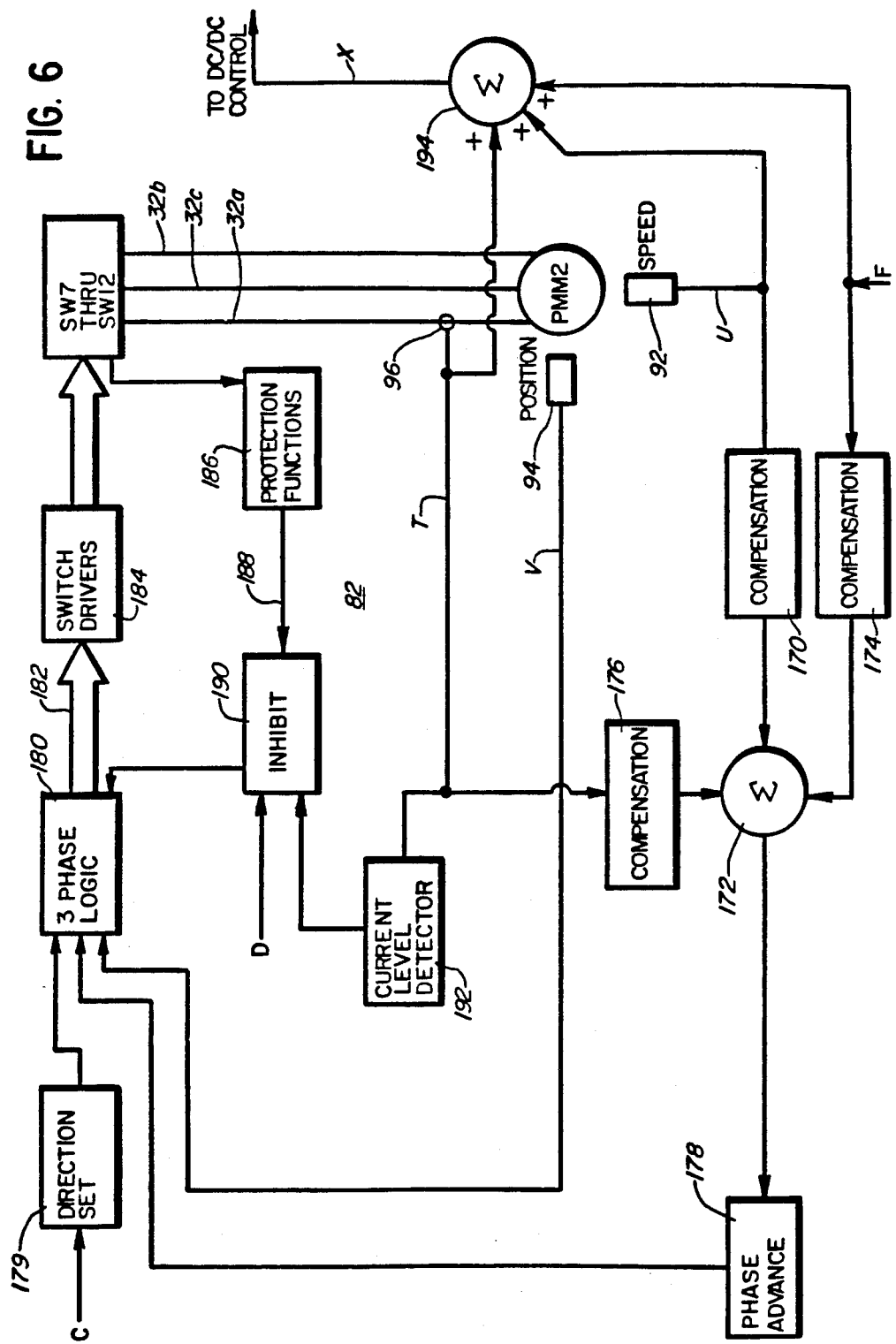

Referring now to FIG. 6, the inverter/rectifier control circuit 82 includes circuits 170-178 and 182-192 which are identical to the circuits 140-148 and 152-162 described above in connection with FIG. 5. However, these circuits use the signals T, U and V representing the phase current in one of the phases of the permanent magnet machine PMM2 and the speed and position of the motive power shaft of the PMM2 rather than the signals O, M and N.

Also, the circuit of FIG. 6 includes a direction set circuit 179 that is responsive to the signal C which indicates the required direction of rotation of the PMM2 and which causes a 180° phase shift in the three-phase logic signals developed by a circuit 180 when the speed of the shaft 14 is above straight-through. The structure and operation of the three-phase logic circuit 180 is in all other respects identical to the circuit 150 described above in connection with FIG. 5.

Further, a summing junction 194 sums the signals T and U representing phase current and shaft speed with the speed error signal F to derive a signal X representing the commanded voltage on the bus 122. That is, this signal represents the required voltage on the bus 122 to operate the PMM2 properly.

Figure 7:
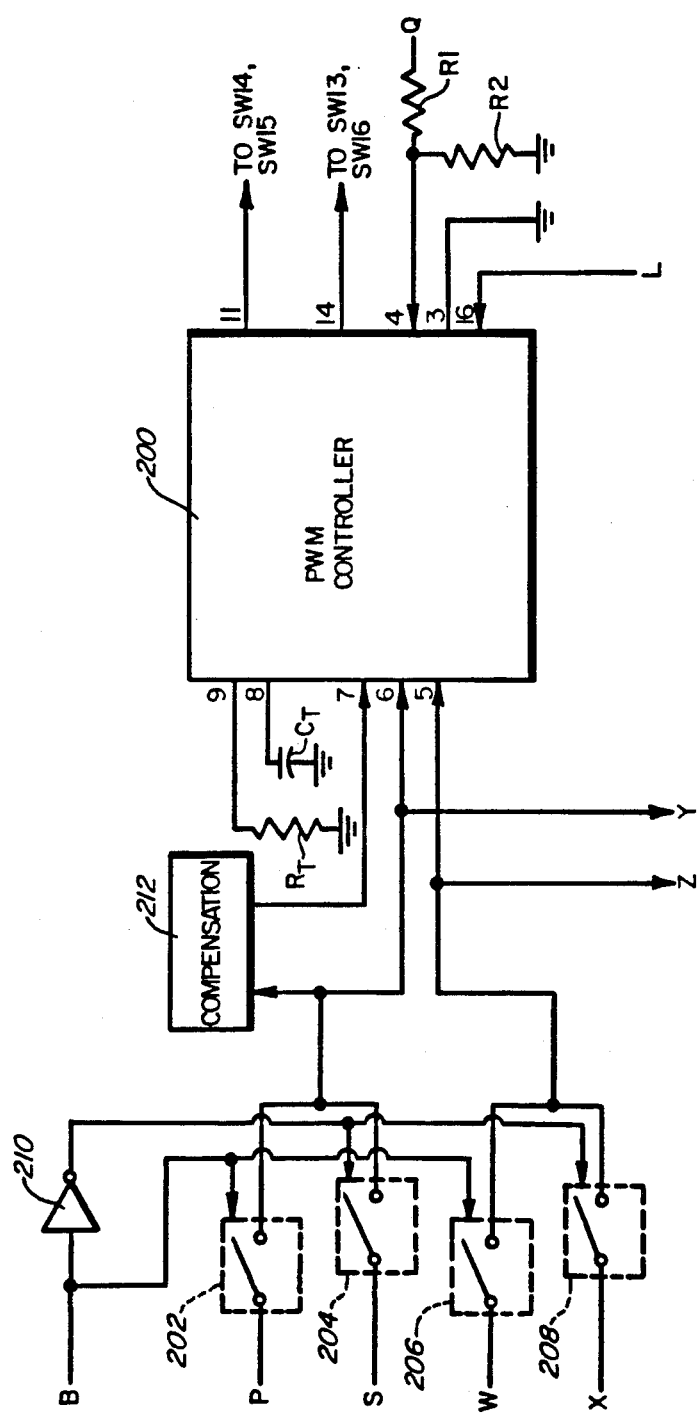

Referring now to FIG. 7, there is illustrated in greater detail the DC/DC control circuit 124 shown in block diagram form in FIG. 2B. The control circuit 124 may be implemented in part by a UC1846 current-mode PWM controller manufactured by Unitrode Corporation of Lexington, Mass. which is identified by the reference numeral 200. The numbers adjacent the perimeter of the block shown in the Figure representing the controller 200 designate the pin numbers of the chip. Of course, a different chip or discrete components may be substituted for the controller 200, if desired.

The controller further includes four controlled switches 202-208, only two of which are closed at any particular time. More particularly, when the state of the signal B is high representing that the speed of the shaft 14 is high enough to run the PMM2 as a generator, the switches 202 and 206 are closed to couple the signals P and W to pins 6 and 5, respectively of the controller 200.

On the other hand, when the signal B is in a low state, an inverter 210 converts this low state signal into a high state signal to close the switches 204 and 208. This action couples the signals S and X to the pins 6 and 5 of the controller 200.

The thus-formed signals Y and Z on the lines coupled to the inputs 6 and 5 represent the voltage at the output of the DC/DC converter 58 on one of the buses 120,122 and a reference level for the output voltage of the DC/DC converter, respectively.

A pin 7 receives a compensated version of the signal Y via a compensation circuit 212. A pin 8 and a pin 9 are coupled to a timing capacitor $C_T$ and a timing resistor $R_T$, respectively. A pin 4 is coupled to the signal Q via a voltage divider consisting of resistors R1 and R2. A pin 3 is coupled to ground while a pin 16 receives the signal L which is the enable signal for the switches SW13-SW16.

The control signals for the switches SW14 and SW15 is developed at a pin 11. The switch control signals for the switches SW13 and SW16 is developed at a pin 14.

Figure 8:
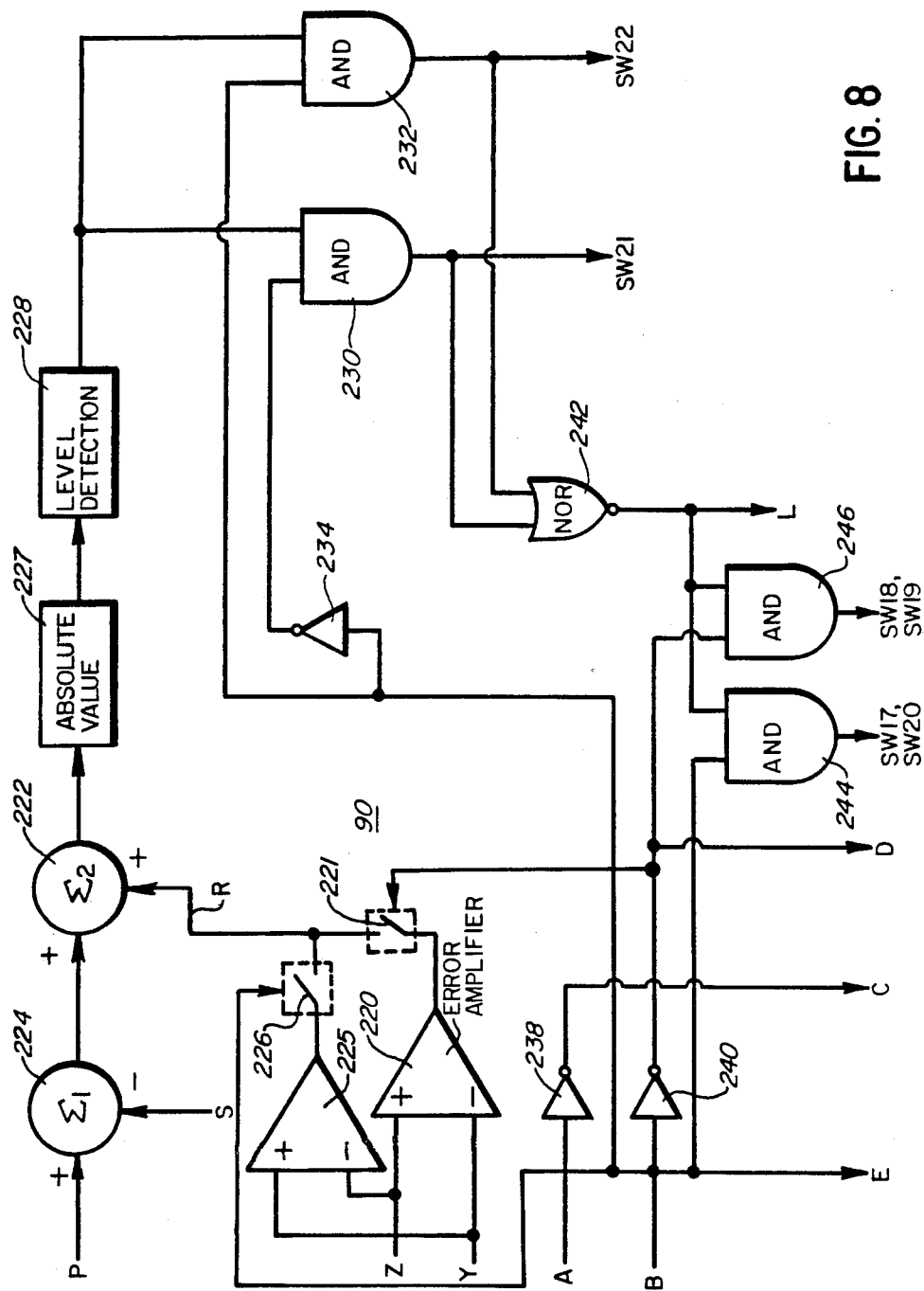

Referring now to FIG. 8, there is illustrated a combined block and logic diagram of the mode selection logic circuit 90.

A first error amplifier 220 substracts the signal Y representing the actual voltage at the output of the DC/DC converter 58 from the reference signal Z to develop an error signal which is coupled by a switch 221 to a first input of a summing junction 222. A summing junction 224 subtracts the signals P and S to derive a signal representing the difference in voltage between the two buses 120, 122. This signal is coupled to a second input of the summing junction 222.

A second error amplifier 225 substracts the signal Z from the signal Y to develop a second error signal which is coupled by a switch 226 to the first input of the summing junction 222. The switches 221,226 are operated in complementary fashion, i.e. when the switch 221 is closed, the switch 226 is open, and vice versa. Therefore, one of the first and second error signals developed by the error amplifiers 220,225 is coupled to the first input of the summing junction 222 as a signal R.

An absolute value circuit 227 converts the output from the summing junction 222 representing the sum of the signal R with the signal from the output of the summing junction 225 to a positive level. The resulting signal is coupled to a level detection circuit 228. The output of the level detection circuit 228 is coupled to a first input of a pair of AND gates 230,232. A second input of the first AND gate 230 receives an inverted version of the signal B from an inverter 234 while a second input of the AND gate 232 directly receives the signal B. The outputs of the AND gates 230,232 are used to control the switches SW21 and SW22, respectively.

The function of the just-described circuitry is to close one of the bypass switches SW21 or SW22 when the summation or total of the difference between the commanded and reference output voltages of the DC/DC converter and the difference between the voltages on the buses 120, 122 is below a predetermined value, which value is determined by the level detection circuit 228.

The mode selection logic circuit 90 also generates various signals which are used by other circuits in the converter. The signal A is inverted by an inverter 238 to develop the signal C while an inverter 240 inverts the signal B to develop the signal D. The signal B controls the switch 226 while the signal D controls the switch 221. The switches 226, 221 are closed by a low state signal B and D, respectively.

The signal B is logically equivalent to the signal E, and hence no additional logic circuitry need be utilized to derive same.

The signal L is developed by passing the outputs of the AND gates 230, 232 through a NOR gate 242. The signal L is in turn combined with the signal B in an AND gate 244 to derive the switch control signals for the switches SW17 and SW20. The signal L is combined with the output of the inverter 240 in an AND gate 246 to derive the switch control signals for the switches SW18 and SW19.

It should be noted that the foregoing description assumes that the condition wherein the speed of the output shaft 14 is equal to straight-through will occur infrequently and only for short periods of time and/or that some error in the desired output speed can be tolerated. However, if this is not the case, then a sixth operational mode may be implemented which is operative when the straight-through condition arises wherein the permanent magnet machine PMM2 is held at zero speed but providing finite torque of a magnitude equal to the torque supplied at the other input and output.

The foregoing description is of an "output differential" configuration wherein the differential is coupled to the PMM2. This configuration may be modified as shown in FIG. 9 to produce an "input differential" configuration.

Figure 9:
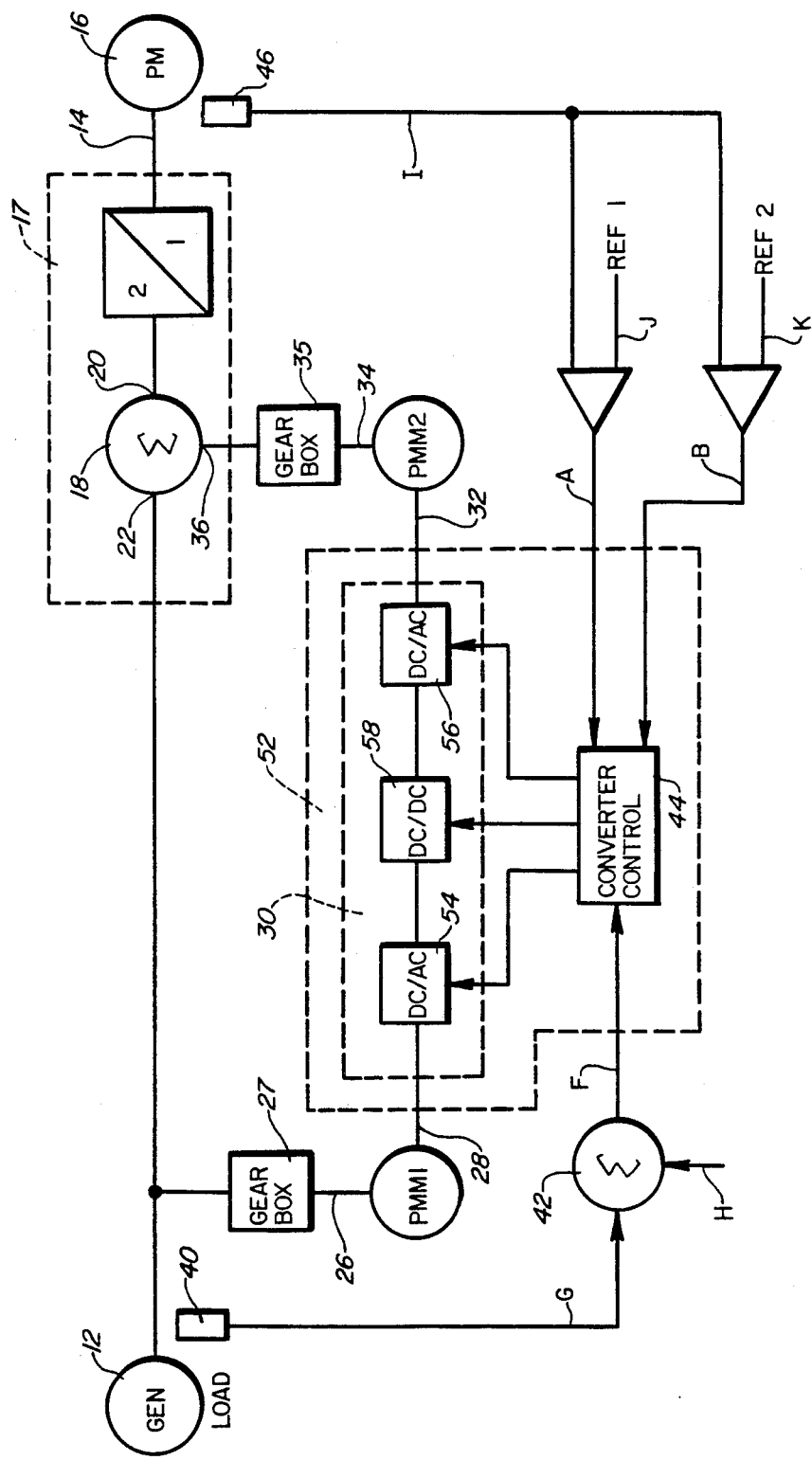
FIG. 9 is a block diagram of an alternative embodiment of the present invention.

As seen in FIG. 9, the output shaft 14 of the prime mover 16 is coupled to the first input 20 of the speed summer 18. The speed-compensating permanent magnet machine PMM2 is coupled to the second input 36 of the differential 18. The output 22 of the differential 18 is coupled directly to the load 12 and to the motive power shaft of the control permanent magnet machine PMM1.

In one embodiment of this configuration, the power converter 30 described in FIG. 1 and subsequent figures is connected to and manages the flow of power between electrical power windings of the permanent magnet machines PMM1 and PMM2 in part in response to the speed error signal developed by the summing junction 42. As before, the windings of the PMM1 are connected to the AC/DC converter 54 while the windings of the PMM2 are connected to the AC/DC converter 56. The converter control 44 operates as noted previously to control the AC/DC and DC/DC converters 54, 56, 58.

In this configuration, the PMM2 adds or subtracts speed from the speed at the input 20 in order to obtain the desired speed at the output 22.

One difference in the configuration of FIG. 9 over that shown in the preceding figures is that the control PMM2 is always driven at a constant speed. This permits the power converter to be simplified.

More specifically, in an alternative embodiment of this configuration, by suitably gearing the PMM1 so that it operates at or near its maximum operating speed, the DC/DC converter 58 need not be capable of boosting and bucking the voltage provided by one of the AC/DC converters 54, 56 for prime mover output speeds above and below straight-through. In this case, the DC/DC converter must only be capable of bucking the voltage provided by the PMM1 and the AC/DC converter 54 before it is applied to the AC/DC converter 56 when the prime mover speed is below straight-through. Further, the DC/DC converter 58 need only boost the voltage developed by the PMM2 and the DC/AC converter 58 before it is applied to the windings of the PMM1 when the prime mover speed is above straight-through. The DC/DC converter 58 may therefore be simpler as can be the DC/DC control circuit 124, FIG. 2B.

In fact, if the prime mover input speed range is limited so that the prime mover always operates below straight-through in the input differential configuration, the DC/DC converter 58 may be eliminated. This is due to the fact that the voltage bucking normally accomplished by the converter 58 may instead be replaced by pulse-width modulated control of the switches in the AC/DC converter 56. Also, power flow is then unidirectional through the converter 30. These consequences lead to a reduction in the size and weight of the power converter 30. It should be noted that this advantage, however, may be outweighed by the fact that the permanent magnet machines which are required would be much larger than for the output differential configuration.

It has been found that the output differential configuration is more efficient than the input differential configuration for shaft speeds below straight-through and that the reverse is true for shaft speeds above straight-through. However, it has been found that the controller for the output differential system must process more power and therefore must be heavier.

It should also be noted that in the input differential configuration, the PMM1 may be operated as a generator and the PMM2 operated as a motor in the "plugging" mode. Also when operating in this mode, it may be possible to bypass the DC/DC converter 58, if desired, to improve efficiency.

Either configuration may be designed whereby the range of speeds of the shaft 14 is constrained to a range entirely below or entirely above straight-through, if desired. If this is the case, the design of the DC/DC converter 58 can be simplified because there may be no requirement to both step up and step down voltages within a single operational mode, and power need flow in only one direction. Also, one of the AC/DC converters associated with the permanent magnet machine which operates as a generator can be simplified. This is because this AC/DC converter need only perform rectification, and not inversion. For the always below straight-through condition, the PMM1 operates only as a generator for either the input or output differential configuration. For the always above straight-through condition, the PMM2 operates only as a generator for either the input or output differential configuration.

We claim:
1. An electrically-compensated constant speed drive (CSD) for developing motive power at a constant speed from variable speed motive power developed at an output shaft of a prime mover, comprising:
a control permanent magnet machine (PMM) having electrical power windings and a motive power shaft;
a speed-compensating permanent magnet machine (PMM) having electrical power windings coupled to the windings of the control PMM and a motive power shaft;

a differential speed summer having a first input coupled to the prime mover output shaft, a second input coupled to the motive power shaft of the speed-compensating PMM and an output at which the constant speed motive power is produced, the motive power shaft of the control PMM being coupled to the output of the speed summer; and a power converter interconnecting the windings of the PMM's for managing the flow of electrical power therebetween whereby motive power is developed by the speed-compensating PMM in an amount sufficient to maintain the output of the speed summer at a desired speed.

2. The electrically-compensated constant speed drive of claim 1, wherein the power converter includes means for operating one of the PMM's as a motor and one of the PMM's as a generator when the speed of the prime mover is below a particular speed and for operating the one PMM as a generator and the other PMM as a motor when the speed of the prime mover is above the particular speed.

3. The electrically-compensated constant speed drive of claim 1, wherein the power converter comprises a first bi-directional AC/DC converter coupled to the electrical power windings of the control PMM, a second bi-directional AC/DC converter coupled to the electrical power windings of the speed-compensating PMM and a bi-directional DC/DC converter coupled between the AC/DC converters.

4. The electrically-compensated constant speed drive of claim 3, further including means for controlling the AC/DC and DC/DC converters in a first mode of operation so that one of the PMM's is operated as a motor and the other of the PMM's is operated as a generator when the speed of the prime mover is less than a particular speed and for controlling the AC/DC and DC/DC converters in a second mode of operation so that the one PMM is operated as a generator and the other PMM is operated as a motor when the speed of the prime mover is greater than a particular speed.

5. An electrically-compensated constant speed drive (CSD) for developing motive power at a constant speed from variable speed motive power developed at an output shaft of a prime mover, comprising:

a control permanent magnet machine (PMM) having electrical power windings and a motive power shaft;

a speed-compensating permanent magnet machine (PMM) having electrical power windings coupled to the windings of the control PMM and a motive power shaft;

a differential speed summer having a first input coupled to the prime mover output shaft, a second input coupled to the motive power shaft of the speed-compensating PMM and an output at which the constant speed motive power is produced, the motive power shaft of the control PMM being coupled to the output of the speed summer;

a first bi-directional AC/DC converter coupled to the electrical power windings of the control PMM;

a second bi-directional AC/DC converter coupled to the electrical power windings of the speed-compensating PMM;

a bi-directional DC/DC converter coupled between the AC/DC converters; and means for controlling the AC/DC converters and the DC/DC converter so that electrical power developed by one of the permanent magnet machines is delivered to the other of the permanent magnet machines whereby motive power is developed by the motive power shaft of the speed-compensating PMM in an amount sufficient to maintain the output of the speed summer at a desired speed.

6. The electrically-compensated constant speed drive of claim 5, wherein the controlling means includes means for operating the converters in one of a plurality of operational modes in dependence upon the speed of the prime mover output shaft.

7. The electrically-compensated constant speed drive of claim 5, wherein the first input of the speed summer is driven at speeds above and below a straight-through speed at which the speed of the first input of the speed summer is equal to the desired speed, and wherein the controlling means includes first and second inverter/rectifier control circuits for controlling the first and second bidirectional AC/DC converters, respectively, a DC/DC control circuit for controlling the bidirectional DC/DC converter and a mode selection logic circuit coupled to the control circuits for causing the control circuits to operate the converters and permanent magnet machines in one of a plurality of operational modes in dependence upon the speed of the first input of the speed summer relative to the straight-through speed.

8. The electrically-compensated constant speed drive of claim 5, further including a mode section logic circuit and wherein the DC/DC converter includes at least one bypass switch for bypassing same and wherein the mode selection logic circuit includes means for selectively closing the bypass switch in accordance with the speed of one of the permanent magnet machines.

9. The electrically-compensated constant speed drive of claim 8, wherein the controlling means includes first means for operating in a first mode of operation when the first speed summer input is driven at speeds well below straight-through speed whereby the control PMM operates as a generator to supply electrical power to the DC/DC converter, the second AC/DC converter and the speed-compensating PMM so that such PMM operates as a motor.

10. The electrically-compensated constant speed drive of claim 9, wherein the controlling means further includes second means for operating in a second mode of operation whereby the bypass switch is closed and the DC/DC converter is deactuated when the control PMM develops sufficient voltage to operate the speed-compensating PMM as a motor.

11. The electrically-compensated constant speed drive of claim 8, wherein the controlling means includes means for operating in a plugging mode when the prime mover output shaft speed is slightly above a straight-through speed whereby the control PMM operates as a generator and the speed-compensating PMM operates as a motor in a plugging mode.

12. The electrically-compensated constant speed drive of claim 8, wherein the controlling means includes means for operating in an above straight-through mode of operation when the first speed summer input is driven at a speed above a straight-through speed whereby the speed-compensating PMM operates as a generator to supply electrical power to the DC/DC converter, the first AC/DC converter and the control PMM so that the control PMM operates as a motor.

13. The electrically-compensated constant speed drive of claim 12, wherein the controlling means further includes means for operating in an above-bypass mode of operation whereby the bypass switch is closed and the DC/DC converter is deactuated when the speed-compensating PMM develops sufficient voltage to operate the control PMM as a motor.

14. The electrically-compensated constant speed drive of claim 5, wherein each AC/DC converter comprises a plurality of power switches connected in a bridge configuration.

15. The electrically-compensated constant speed drive of claim 14, wherein each AC/DC converter further includes flyback diodes coupled across the power switches.

16. The electrically-compensated constant speed drive of claim 5, wherein the DC/DC converter includes a bridge inverter for converting input DC power from one of the AC/DC converters into intermediate AC power, a transformer having a primary winding coupled to the output of the bridge inverter and a secondary winding in which is developed transformer output power and a rectifier circuit coupled to the secondary winding for rectifying the transformer output power to develop output DC power for the other of the AC/DC converters.

17. The electrically-compensated constant speed drive of claim 16, wherein the output shaft of the prime mover is driven at speeds above and below a straight-through speed at which the speed of the first input of the speed summer is equal to the desired speed and wherein the DC/DC converter includes a first pair of bus switches for selectively coupling an input of the bridge inverter to either of the AC/DC converters and means for operating the first pair of bus switches in dependence upon whether the speed of the prime mover output is above or below the straight-through speed.

18. The electrically-compensated constant speed drive of claim 17, wherein the DC/DC converter further includes a second pair of bus switches for coupling the rectifier circuit to either of the AC/DC converters and means for operating the second pair of bus switches in dependence upon the operation of the first pair of switches so that the rectifier circuit is coupled to one of the AC/DC converters while the input of the bridge inverter is coupled to the other of the AC/DC converters, and vice versa.

19. The electrically-compensated constant speed drive of claim 15, wherein the first input of the speed summer is driven at speeds above and below the desired speed and each of the permanent magnet machines is operated as a motor or a generator depending upon the speed of the first input, wherein the controlling means includes means for opening all of the power switches in the AC/DC converter coupled to the permanent magnet machine that is operating as a generator so that the power developed thereby is rectified by the flyback diodes.

20. An electrically-compensated constant speed drive (CSD) for developing motive power at a constant speed from variable speed motive power developed at an output shaft of a prime mover, comprising:
a differential speed summer having a first input shaft coupled to the prime mover output shaft, a second input shaft and an output shaft at which the constant speed motive power is produced;
a first permanent magnet machine having a motive power shaft coupled to the differential speed summer output shaft and electrical power windings;
a second permanent magnet machine having a motive power shaft coupled to the second shaft input of the differential speed summer and electrical power windings; and
a power converter coupled between the electrical power windings of the permanent magnet machines including
first and second AC/DC converters coupled to the electrical power windings of the first and second permanent magnet machines, respectively each AC/DC converter including an input/output bus, a plurality of controlled switches connected in a bridge configuration and a plurality of flyback diodes each coupled across and associated with one of the controlled switches, the controlled switches and diodes being connected to the input/output bus;
a bi-directional DC/DC converter coupled between the AC/DC converters and including a bridge inverter, first and second input steering switches coupled between the input/ output buses of the first and second AC/DC converters and the bridge inverter, respectively, a rectifier circuit coupled to an output of the bridge inverter and first and second output steering switches coupled between the rectifier circuit and the input-output buses of the first and second AC/DC converters, respectively; and
means responsive to the speed of the prime mover output shaft for controlling the controlled switches, the bridge inverter and the input and output steering switches so that one of the permanent magnet machines operates as a motor and the other of the permanent magnet machines operates as a generator whereby the motive power shaft of the second permanent magnet machine is driven at a speed magnitude and direction which maintains the speed of the output shaft of the speed summer at a desired speed.

21. The electrically-compensated constant speed drive of claim 20, wherein the controlling means includes means for closing the first input steering switch and the second output steering switch when the first permanent magnet machine operates as a generator and the second permanent magnet machine operates as a motor.

22. The electrically-compensated constant speed drive of claim 20, wherein the controlling means includes means for closing the second input steering switch and the first output steering switch when the second permanent magnet machine operates as a generator and the first permanent magnet machine operates as a motor.

23. The electrically-compensated constant speed drive of claim 20, wherein the controlling means includes means for opening all of the controlled switches of the first AC/DC converter and for operating the controlled switches of the second AC/DC converter to invert the power developed by the rectifier circuit when the first permanent magnet machine operates as a generator.

24. The electrically-compensated constant speed drive of claim 20, wherein the DC/DC converter includes first and second bypass switches and wherein the controlling means includes means for closing one of the bypass switches and for deactuating the bridge inverter when the voltage developed by the permanent magnet machine which is operating as a generator is sufficient to operate the other permanent magnet machine as a motor.

* * * * *